United States Patent Office 2,983,194
Patented May 9, 1961

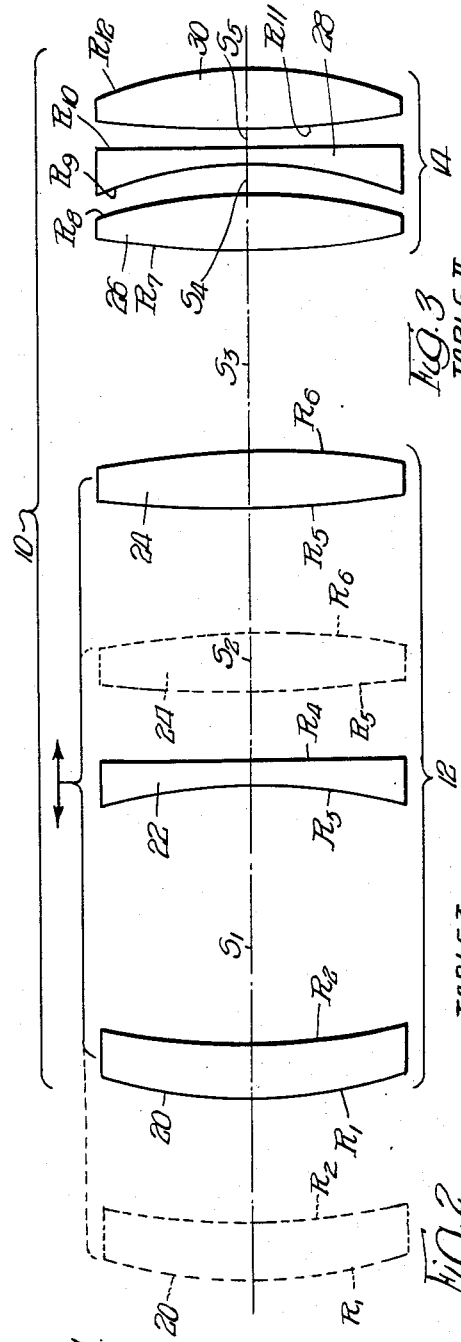

2,983,194

VARIABLE FOCAL LENGTH OPTICAL OBJECTIVE

John R. Miles, Glenview, Ill., assignor to Optikyle, Inc., Wilmington, Del., a corporation of Delaware Filed May 6, 1959, Ser. No. 811,478

5 Claims. (Cl. 88—57)

This invention pertains to optical systems and in particular to variable focal length optical systems commonly referred to as vari-focal, panchratic, or zoom systems.

Variable focal length systems have been known for many years, and numerous designs and arrangements have been proposed. The advent of television has, in particular, caused a considerable amount of recent research and development to be directed toward such systems. One problem which has imposed a serious limitation on the use of variable focal length systems is the difficulty in providing a well corrected system having a relative speed faster than $f/2.0$, when designed along conventional and known concepts. In fact, the speeds of most of the prior art systems have been slower than $f/3.0$.

For this reason it has been necessary to invent a variable focal length system incorporating new concepts and principles in order to provide a system capable of a relative speed of $f/1.6$ or faster and which is at the same time well corrected. This system has the further desirable characteristic of a substantially constant back focal length throughout a substantial change in equivalent focal length. By "well corrected" it is meant that the aberrations are approximately the same as or less than those of a comparable high quality nonvariable system. By a "substantially constant back focal length" it is meant a variation less than the aberrations of the lens system.

In view of the foregoing a first feature and object of the invention resides in the provision of a variable focal length lens system which is well corrected and is capable of a relative speed of $f/1.6$ or even faster.

Another feature and object of the invention resides in the provision of a variable focal length lens system having a substantially constant back focal length throughout a substantial change in equivalent focal length.

Another object of the invention is to provide a variable focal length optical system that is especially adapted for use as an objective lens assembly in a projector.

Another object of this invention is to provide a variable focal length lens assembly which can be manufactured at a reduced cost and which is at the same time corrected for spherical and chromatic aberrations, coma, astigmatism, and curvature of the field, throughout a substantial range of focal lengths while still maintaining a back focal length of between 70 and 75 percent of the equivalent focal length of the objective.

A still further object of the invention resides in the provision of a variable focal length lens assembly in which the equivalent focal length may be varied by moving two of the lens elements together along the optical axis by a simple mechanical motion.

These and other objects of the invention will be apparent upon reading the specification with reference to the following drawing:

In the drawing:

Figure 1 is a diagrammatic illustration of one embodiment of the variable focal length lens assembly incorporating the invention which has a nominal focal length of 100 units.

Figure 2 is a table of constructional data for the first group of lens elements in the lens assembly shown in Figure 1.

Figure 3 is a table of constructional data for the second group of lens elements in the lens assembly shown in Figure 1.

Figure 4 is a table of air spaces applicable to the embodiment shown in Figure 1 illustrating the position of the various lens elements for different focal lengths.

It is to be noted that the variable focal length optical system embodying the invention and disclosed herein is particularly suited for use as the objective lens assembly in projectors. However, this use is merely by way of example and in no manner is to be construed as a limitation. As a matter of fact, it is possible to utilize the principles of this invention to construct variable focal length optical systems which may be used in various types of environments. It is also to be noted that the numerical values set forth herein are not limited to any specific type of unit but are relative values.

Referring now to Figure 1, there is shown one preferred embodiment of the optical system incorporating the invention and which is generally denoted by the numeral 10. The optical system in this preferred form consists of six lens elements which may be considered as divided into two groups.

The first group, generally denoted by the numeral 12, provides the variable characteristic and includes elements 20, 22, and 24, which are airspaced and in optical alignment. As will be explained more fully hereinafter, the elements 20 and 24 are moved simultaneously along the optical axis with respect to the element 22 in order to vary the focal length of the system.

The second group of the system 14 acts as a relay system for increasing the over-all power of the system and thereby increases the speed of the system. In this particular instance the second portion 14 includes three elements 20, 22, and 24, which are airspaced and are in optical alignment. As a result of this invention, the field curvature, astigmatism, and coma, as well as chromatic and spherical aberrations are within acceptable limits for all values of adjustment wherein the focal length is varied over the range referred to. "Acceptable" in the case of the present invention is herein taken as approximately equal to the values of accepted standard non-varying projection lenses of the same speed and focal length. The subject optical system has a speed of $f/1.6$ or slightly faster. In the present invention the back-focal length varies only by .058 unit in 73 which is less than the aberrations even though the latter are small.

It will also be noted that although six elements are used in the construction of the system, it is not necessary to utilize complicated cams and spirally grooved tubes to manipulate the lens elements. This advantage is the result of the fact that the elements 20 and 24 in the first group 12 are interconnected to be relatively immovable so as to be simultaneously movable with respect to the balance of the system along its optical axis.

Referring back to Figure 1, it can be seen that the lens group 12 includes a first element 20 which is adjacent to the long conjugate side of the assembly. This element is of a meniscus construction with the convex side toward the long conjugate. The surfaces of the lens element 20 are designated $R_1$ and $R_2$ and have radii of curvature 132.46 and 225.89, respectively. The thickness $T_{1-2}$ of element 20 is 12.63. The first element 20 structed of a flint glass and has an index of refraction tion and reciprocal dispersion ratio of 1.525 and 51.2, respectively.

The second element 22 is a diverging lens having a concave surface of $R_3$ and a substantially plano surface $R_4$. In the preferred embodiment the values for $R_3$ and $R_4$ are −126.67 and infinity, respectively; however, $R_4$ may be as small as ±2,000 units. The thickness $T_{3-4}$ of lens elements 22 is 5.58. The element 22 is constructed of a flint glass and has in index of refraction and reciprocal dispersion ratio of 1.620 and 36.3, respectively.

The third element is a double convex converging lens having the surfaces $R_5$ and $R_6$ with radii of curvature of 347.74 and −254.35, respectively. The lens element 24 is constructed of crown glass and has an index of refraction and reciprocal dispersion ratio of 1.6204 and 60.3, respectively. The thickness $T_{5-6}$ of lens element 24 is 12.63.

The constructional data of the first group 12 is set forth below in tabular form:

Table I

| Lens | Radii | Thicknesses | Spaces | $N_D$ | V |
|---|---|---|---|---|---|
| I | $R_1=132.46$<br>$R_2=225.89$ | $T_{1-2}=12.63$ | Variable | 1.525 | 51.2 |
| II | $R_3=-126.67$<br>$R_4=\infty$ | $T_{3-4}=5.58$ | Variable | 1.620 | 36.3 |
| III | $R_5=347.74$<br>$R_6=-254.35$ | $T_{5-6}=12.63$ | Variable | 1.620 | 60.3 |

The constructional data set forth in Table I and those following disclose a preferred embodiment of the subject invention. In these tables the symbol R represents the radii of the refractive lens surfaces; T represents the axial thickness; S represents the spacing; $N_D$ is the refractive index in sodium D light; V is the reciprocal dispersion ratio; EF is the equivalent focal length in sodium D light; and BF is the back focal length.

The values given in the above table and those following represent preferred embodiments of the elements, although as indicated, other values also could be used. For example: All radii could vary by an amount of 2 percent of the absolute value of their reciprocal. The thickness could vary by an amount of 20 percent. The index of refraction and the reciprocal dispersion ratio of the glass in each instance could vary by ±.025 and ±1.0 respectively. Such variations can be made as long as technical compensations are made in the construction of the system.

Referring now to the second group 14, there is shown a triplet which acts as a relay system for the first group 12. While the preferred form of the invention contemplates the use of the triplet as defined hereinafter, it is apparent that other types of relay systems may be used where desired or necessary.

The relay system 14 includes a double convex first element 26 with surfaces $R_7$ and $R_8$ having respective radii of curvature of 101.46 and −217.42. The lens element 26 is constructed of crown glass and has an index of refraction and reciprocal dispersion ratio of 1.620 and 60, respectively. The thickness $T_{7-8}$ of lens element 26 is 16.23.

The second element 28 of the relay system 14 is a negative element that is biconcave in construction having the surfaces $R_9$ and $R_{10}$. The surfaces $R_9$ and $R_{10}$ have respective radii of curvature of −98.11 and 416.43. The lens element 28 is constructed of flint glass and has an index of refraction and reciprocal dispersion ratio of 1.720 and 29.2 respectively. The thickness $T_{9-10}$ of the lens element 28 is 5.1.

The third lens element 30 of the relay system 14 is double convex and has the surfaces $R_{11}$ and $R_{12}$ which have the respective radii curvatures of 136.86 and −145.23. The element 30 is constructed of crown glass and has an index of refraction and reciprocal dispersion ratio of 1.620 and 60 respectively. The thickness $T_{11-12}$ of the third element 30 is 16.23.

The constructional data of the second group 14 is set forth below in tabular form:

Table II

| Lens | Radii | Thicknesses | Spaces | $N_D$ | V |
|---|---|---|---|---|---|
| I | $R_7=101.46$<br>$R_8=-217.42$ | $T_{7-8}=16.23$ | $S_4=8.3$ | 1.620 | 60 |
| II | $R_9=-98.11$<br>$R_{10}=416.43$ | $T_{9-10}=5.1$ | $S_5=5.1$ | 1.720 | 29.2 |
| III | $R_{11}=136.86$<br>$R_{12}=-145.23$ | $T_{11-12}=16.23$ | | 1.620 | 60 |

Intermediate the individual lens elements composing the first and second groups 12 and 14 are the spaces $S_1$ through $S_5$. The spaces $S_1$ through $S_3$ are variable and are determined by the position of the lens elements 20 and 24, as will be seen hereinafter. The spaces $S_4$ and $S_5$ are substantially constant and are equal to 8.3 and 5.1, respectively. The first and third elements 20 and 24 of the first group 12 are separated by a fixed space and are movable along the optical axis of the assembly 10 with respect to the lens element 22 and the relay system 14. By moving these elements the focal length of the system is varied.

In Table III below there are shown in tabular form the equivalent focal lengths and back focal lengths of the system at various positions of the lens elements 20 and 24.

Table III

| EF | $S_1$ | $S_2$ | $S_3$ | BF |
|---|---|---|---|---|
| 82.3 | 39.37 | 109.9 | 6.95 | 73.620 |
| 100 | 59.8 | 79.4 | 37.4 | 73.563 |
| 139 | 110.5 | 28.7 | 88.1 | 73.562 |

In particular the subject lens assembly is designed to have a nominal equivalent focal length of 100 units in which the focal length may be varied between 82.3 and 139 units. The back-focal length of the lens system is substantially 73.563 at the nominal setting and varied between 73.562 units and 73.620 units for the total range of focal length.

The free apertures of the lens elements in their preferred embodiments may be made sufficiently large to allow an $f/1.6$ bundle to transverse all of the lens elements and a field angle with a 60 percent edge bundle may be attained at approximately 14.5 degrees for the nominal 100 unit focal length.

As was mentioned previously, one of the particular uses of the subject invention is in a projector as the objective lens assembly. This invention as set forth in its preferred embodiment has been found to be especially suitable for those systems in which the screen is placed approximately 12 feet from the projector. By means of this invention it is possible to enlarge the picture or decrease its size whenever desired within the relative range of 1–1.68 as mentioned previously.

Although a preferred form of the invention has been set forth, it is to be understood that this is merely by way of example and not to be construed as a limitation. It is contemplated that certain changes may be made within the scope of the claims without departing from the spirit of the invention.

What is claimed is:
1. A variable focal length lens system capable of a relative aperture of between $f/1.5$ and $f/1.7$, said lens system being substantially corrected for spherical aberration, chromatic aberration, coma, astigmatism, and field curvature, having a substantially constant back focal length of between the range 82.9 and 139 equivalent focal length, said lens system being composed of a first lens group comprising at least three lens elements spaced and in optical alignment with the first and third elements being movable along their optical axis with respect to the second element, and in which said first, second and third lens elements are constructed in accordance with the following data:

Table I

| Lens | Radii | Thicknesses | Spaces | $N_D$ | V |
|---|---|---|---|---|---|
| I | $R_1=132.46$<br>$R_2=225.89$ | $T_{1-2}=12.63$ | | 1.525 | 51.2 |
| | | | Variable | | |
| II | $R_3=-126.67$<br>$R_4=\infty$ | $T_{3-4}=5.58$ | | 1.620 | 36.3 |
| | | | Variable | | |
| III | $R_5=347.74$<br>$R_6=-254.35$ | $T_{5-6}=12.63$ | | 1.620 | 60.3 |
| | | | Variable | | | and a second lens group comprising a relay system composed of at least one lens element in optical alignment with said first lens group in which said second lens group accepts the image formed by the first lens group and reforms it, wherein R and T represent the radius of curvature of the lens surfaces, and, thickness, respectively, and $N_D$ and V the refractive index and reciprocal dispersion ratio, respectively.

2. A variable focal length lens system capable of a relative aperture of between $f/1.5$ and $f/1.7$, said lens system being substantially corrected for spherical aberration, chromatic aberration, coma, astigmatism, and field curvature, having a substantially constant back focal length of between the range 82.9 and 139 equivalent focal length, said lens system being composed of a first lens group comprising at least three lens elements spaced and in optical alignment with the first and third elements being movable along their optical axis with respect to the second element, and in which said first, second and third lens elements are constructed in accordance with the following data:

Table I

| Lens | Radii | Thicknesses | Spaces | $N_D$ | V |
|---|---|---|---|---|---|
| I | $R_1=132.46$<br>$R_2=225.89$ | $T_{1-2}=12.63$ | | 1.525 | 51.2 |
| | | | Variable | | |
| II | $R_3=-126.67$<br>$R_4=\infty$ | $T_{3-4}=5.58$ | | 1.620 | 36.3 |
| | | | Variable | | |
| III | $R_5=347.74$<br>$R_6=-254.35$ | $T_{5-6}=12.63$ | | 1.620 | 60.3 |
| | | | Variable | | | and a second lens group comprising a relay system composed of at least three elements in optical alignment with said first group, in which said first and third elements are convergent and said second element is divergent, wherein R and T represent the radius of curvature of the lens surfaces, and, thickness, respectively, and $N_D$ and V the refractive index and reciprocal dispersion ratio, respectively.

3. A variable focal length lens system capable of a relative aperture of between $f/1.5$ and $f/1.7$, said lens system being substantially corrected for spherical aberration, chromatic aberration, coma, astigmatism, and field curvature, having a substantially constant back focal length of between the range 82.9 and 139 unit equivalent focal length, said lens system being composed of a first lens group comprising at least three lens elements spaced and in optical alignment with the first and third elements being movable along their optical axis with respect to the second element, and in which said first, second, and third lens elements are constructed in accordance with the following data:

Table I

| Lens | Radii | Thicknesses | Spaces | $N_D$ | V |
|---|---|---|---|---|---|
| I | $R_1=132.46$<br>$R_2=225.89$ | $T_{1-2}=12.63$ | | 1.525 | 51.2 |
| | | | Variable | | |
| II | $R_3=-126.67$<br>$R_4=\infty$ | $T_{3-4}=5.58$ | | 1.620 | 36.3 |
| | | | Variable | | |
| III | $R_5=347.74$<br>$R_6=-254.35$ | $T_{5-6}=12.63$ | | 1.620 | 60.3 |
| | | | Variable | | | and a second lens group comprising a relay system composed of at least three elements in optical alignment with said first group, and in which said first, second and third elements of said second group are constructed in accordance with the following data:

Table II

| Lens | Radii | Thicknesses | Spaces | $N_D$ | V |
|---|---|---|---|---|---|
| I | $R_7=101.46$<br>$R_8=-217.42$ | $T_{7-8}=16.23$ | | 1.620 | 60 |
| | | | $S_4=8.3$ | | |
| II | $R_9=-98.11$<br>$R_{10}=416.43$ | $T_{9-10}=5.1$ | | 1.720 | 29.2 |
| | | | $S_5=5.1$ | | |
| III | $R_{11}=136.86$<br>$R_{12}=-145.23$ | $T_{11-12}=16.23$ | | 1.620 | 60 | wherein R and T represent the radius of curvature, and, thickness, respectively, and $N_D$ and V the refractive index and reciprocal dispersion ratio, respectively.

4. A variable focal length lens system substantially corrected for spherical aberration, chromatic aberration, coma, astigmatism, and field curvature, having a substantially constant back focal length of between the range 82.9 and 139 equivalent focal length, said lens system being composed of a first lens group comprising at least three lens elements in optical alignment with the first and third elements being separated by a constant space and movable along their optical axis with respect to said second element to vary the focal length, and in which said first, second and third lens elements are constructed in accordance with the following data:

Table I

| Lens | Radii | Thicknesses | Spaces | $N_D$ | V |
|---|---|---|---|---|---|
| I | $R_1=132.46$<br>$R_2=225.89$ | $T_{1-2}=12.63$ | | 1.525 | 51.2 |
| | | | Variable | | |
| II | $R_3=-126.67$<br>$R_4=\infty$ | $T_{3-4}=5.58$ | | 1.620 | 36.3 |
| | | | Variable | | |
| III | $R_5=347.74$<br>$R_6=-254.35$ | $T_{5-6}=12.63$ | | 1.620 | 60.3 |
| | | | Variable | | | and a second lens group comprising a relay system composed of at least three lens elements in optical alignment with said first group, and in which said first, second and third elements of said second group are constructed in accordance with the following data:

*Table II*

| Lens | Radii | Thicknesses | Spaces | $N_D$ | V |
|---|---|---|---|---|---|
| I | $R_7 = 101.46$ | $T_{7-8} = 16.23$ | | 1.620 | 60 |
|   | $R_8 = -217.42$ | | $S_4 = 8.3$ | | |
| II | $R_9 = -98.11$ | $T_{9-10} = 5.1$ | | 1.720 | 29.2 |
|    | $R_{10} = 416.43$ | | $S_5 = 5.1$ | | |
| III | $R_{11} = 136.86$ | $T_{11-12} = 16.23$ | | 1.620 | 60 |
|     | $R_{12} = -145.23$ | | | | | wherein R and T represent the radius of curvature of the lens surfaces, and, thicknesses, respectively, and $N_D$ and V the refractive index and reciprocal dispersion ratio, respectively.

5. A variable focal length lens system capable of a relative aperture of between $f/1.5$ and $f/1.7$, said lens system being substantially corrected for spherical aberration, chromatic aberration, coma, astigmatism, and field curvature, having a substantially constant back focal length of between the range 82.9 and 139 equivalent focal length, said lens system being composed of a first lens group comprising at least three lens elements in optical alignment with the first and third elements being separated by a constant space and movable along their optical axis with respect to said second element to vary the focal length, and in which said first, second and third lens elements are constructed in accordance with the following data:

*Table I*

| Lens | Radii | Thicknesses | Spaces | $N_D$ | V |
|---|---|---|---|---|---|
| I | $R_1 = 132.46$ | $T_{1-2} = 12.63$ | | 1.525 | 51.2 |
|   | $R_2 = 225.89$ | | Variable | | |
| II | $R_3 = -126.67$ | $T_{3-4} = 5.58$ | | 1.620 | 36.3 |
|    | $R_4 = \infty$ | | Variable | | |
| III | $R_5 = 347.74$ | $T_{5-6} = 12.63$ | | 1.620 | 60.3 |
|     | $R_6 = -254.35$ | | Variable | | | and a second lens group comprising a relay system composed of at least three elements in optical alignment with said first group, and in which said first, second and third elements of said second group are constructed in accordance with the following data:

*Table II*

| Lens | Radii | Thicknesses | Spaces | $N_D$ | V |
|---|---|---|---|---|---|
| I | $R_7 = 101.46$ | $T_{7-8} = 16.23$ | | 1.620 | 60 |
|   | $R_8 = -217.42$ | | $S_4 = 8.3$ | | |
| II | $R_9 = -98.11$ | $T_{9-10} = 5.1$ | | 1.720 | 29.2 |
|    | $R_{10} = 416.43$ | | $S_5 = 5.1$ | | |
| III | $R_{11} = 136.86$ | $T_{11-12} = 16.23$ | | 1.620 | 60 |
|     | $R_{12} = -145.23$ | | | | | wherein R and T represent the radius of curvature of the lens surfaces, and thickness, respectively, and $N_D$ and V the refractive index and reciprocal dispersion ratio, respectively, and wherein the equivalent focal length (EF) varies as follows in accordance with the following spaces (S) between the lens elements in said first group and between said first group and said second group:

*Table III*

| EF | $S_1$ | $S_2$ | $S_3$ | BF |
|---|---|---|---|---|
| 82.3 | 29.37 | 109.9 | 6.95 | 73.620 |
| 100 | 59.8 | 79.4 | 37.4 | 73.563 |
| 139 | 110.5 | 28.7 | 88.1 | 73.562 |

References Cited in the file of this patent

UNITED STATES PATENTS

| | | |
|---|---|---|
| 2,566,485 | Cuvillier | Sept. 4, 1951 |
| 2,732,763 | Back et al. | Jan. 11, 1956 |
| 2,741,947 | Back | Apr. 17, 1956 |

UNITED STATES PATENT OFFICE
CERTIFICATE OF CORRECTION

Patent No. 2,983,194

May 9, 1961

John R. Miles

It is hereby certified that error appears in the above numbered patent requiring correction and that the said Letters Patent should read as corrected below.

Column 2, lines 67 and 68, for "structed of a flint glass and has an index of refraction tion" read -- is constructed of crown glass and has an index of refraction --; column 3, line 4, for "in" read -- an --.

Signed and sealed this 31st day of October 1961.

(SEAL)
Attest:

ERNEST W. SWIDER
Attesting Officer

DAVID L. LADD
Commissioner of Patents